US007412653B2

(12) United States Patent
Gates

(10) Patent No.: US 7,412,653 B2
(45) Date of Patent: Aug. 12, 2008

(54) REMOTE CONTROL HAVING A DISPLAY WITH MULTI-FUNCTION EL SEGMENTS

(75) Inventor: Stephen Brian Gates, Mission Viejo, CA (US)

(73) Assignee: Universal Electronics, Inc., Cypress, CA (US)

(*) Notice: Subject to any disclaimer, the term of this patent is extended or adjusted under 35 U.S.C. 154(b) by 697 days.

(21) Appl. No.: 10/702,757

(22) Filed: Nov. 6, 2003

(65) Prior Publication Data

US 2005/0116930 A1 Jun. 2, 2005

(51) Int. Cl.
*G06F 3/00* (2006.01)

(52) U.S. Cl. ....................... 715/716; 715/835; 345/172; 345/173

(58) Field of Classification Search ................. 715/716, 715/835, 172, 173; 345/173, 172
See application file for complete search history.

(56) References Cited

U.S. PATENT DOCUMENTS

| | | | | |
|---|---|---|---|---|
| 3,968,443 A | | 7/1976 | Leuschner | |
| 4,031,474 A | | 6/1977 | Ehni, III et al. | |
| 4,623,887 A | | 11/1986 | Welles, II | |
| 4,825,209 A | | 4/1989 | Sasaki et al. | |
| 4,959,810 A | | 9/1990 | Darbee et al. | |
| 5,249,121 A | * | 9/1993 | Baum et al. | 606/1 |
| 5,614,906 A | | 3/1997 | Hayes et al. | |
| 5,959,751 A | | 9/1999 | Darbee et al. | |
| 5,982,355 A | | 11/1999 | Jaeger et al. | |
| 6,008,836 A | | 12/1999 | Bruck et al. | |
| 6,014,092 A | | 1/2000 | Darbee et al. | |
| 6,168,283 B1 | * | 1/2001 | Howell | 362/84 |
| 6,211,856 B1 | * | 4/2001 | Choi et al. | 345/666 |
| 6,225,938 B1 | | 5/2001 | Hayes et al. | |
| 6,243,080 B1 | * | 6/2001 | Molne | 345/173 |
| 6,538,643 B2 | | 3/2003 | Mori et al. | |
| 6,577,496 B1 | * | 6/2003 | Gioscia et al. | 361/681 |
| 6,633,281 B2 | * | 10/2003 | Lin et al. | 345/173 |
| 6,947,101 B2 | * | 9/2005 | Arling | 348/734 |
| 6,988,247 B2 | * | 1/2006 | Janevski | 715/835 |
| 2002/0158852 A1 | | 10/2002 | Mori et al. | |
| 2003/0025840 A1 | | 2/2003 | Arling | |

FOREIGN PATENT DOCUMENTS

| | | |
|---|---|---|
| WO | WO 00/72638 A1 | 11/2000 |
| WO | WO 01/41308 A1 | 6/2001 |
| WO | WO 01/48586 A3 | 7/2001 |
| WO | WO 02/089109 A1 | 11/2002 |

* cited by examiner

*Primary Examiner*—Tadesse Hailu
*Assistant Examiner*—Michael Roswell
(74) *Attorney, Agent, or Firm*—Greenberg Traurig LLP

(57) ABSTRACT

An EL display is provided with EL segments which are individually illuminable and which include one or more complete function key images and/or fragments of complete function key images. One or more of the EL segments may thus be illuminated to present multiple, different user interfaces each having one or more complete function key images. A complete function key image presented as part of a user interface may be a complete key image that was included as part of an illuminated EL segment or may be formed by a combination of key image fragments included as part of multiple illuminated EL segments.

14 Claims, 8 Drawing Sheets

Segment 1

Segment 2

Segment 3

Segment 4

Segment 5

Segment 6

Segment 7

Segment 1
+
Segment 3
+
Segment 4
+
Segment 7

Segment 1
+
Segment 2
+
Segment 4
+
Segment 5

REMOTE CONTROL HAVING A DISPLAY WITH MULTI-FUNCTION EL SEGMENTS

BACKGROUND

This invention relates generally to devices having displays and, more particularly, relates to a remote control having a display with multi-function electroluminescent ("EL") segments.

Devices having EL displays are known in the art. By way of example only, PCT patent application WO 00/72638, entitled "electroluminescent display," discloses an EL display comprised of a transparent front-electrode, rear electrodes, and a layer of electroluminescent material located between the first and second electrodes. Conductive tracks are electrically connected to the rear electrodes and supply a driving voltage for the electroluminescent material to the rear electrodes. A backplane layer is provided between the electroluminescent material layer and the conductive tracks are electrically connected to the front electrode, such that the potential difference across the electroluminescent material layer in the region of the conductive tracks is substantially zero. In this way, when the conductive track is supplying the driving voltage to the rear-electrodes the electroluminescent material layer is not illuminated by an electric field between the conductive tracks and the front electrode. Gaps may be defined in the front electrode corresponding substantially to the location of the conductive tracks. This also prevents the voltage in the conductive tracks from illuminating the electroluminescent material layer.

It is further known to utilize such an EL display in a universal remote control of the type for controlling the operation of various appliances of various types and various manufacturers. In this regard, commonly assigned U.S. patent application Ser. No. 10,410,103, entitled "Remote Control With Screen Guided Display," discloses a universal remote control having an EL display where various segments of the EL display are independently illuminated at various times to present the user with a remote control user interface that corresponds to an activity currently being performed by the user. In particular, the segments that are individually illuminable correspond to an entire key image, e.g., an image representing a transport command such as play, fast forward, rewind, etc., and/or blocks of entire key images.

While a universal remote control having an EL display that can be selectively illuminated to provide multiple remote control user interfaces is desirable, it is seen that increasing the number of individually illuminable EL segments in the EL display also increases the overall manufacturing cost of the universal remote control. Accordingly, a need exists for a universal remote control that has an EL display that can be selectively illuminated to provide multiple remote control user interfaces and which can be manufactured in a relatively more cost effective manner.

SUMMARY OF THE INVENTION

In accordance with this and other needs, the following describes a universal remote control having an EL display with multi-function EL segments that can be selectively illuminated in various combinations to provide multiple remote control user interfaces. To this end, the multi-function EL segments each include one or more complete function key images and/or fragments (which may be contiguous or non-contiguous fragments of the EL display) of complete function key images whereby one or more of the EL segments may be illuminated to present multiple, different remote control user interfaces each having one or more complete function key images. Specifically, a complete function key image presented as part of a remote control user interface may be a complete key image that was included as part of an illuminated EL segment or may be formed by a combination of function key image fragments included as part of multiple illuminated EL segments. In this manner, the described universal remote control EL display has the advantage of minimizing the number of EL segments required to present multiple remote control user interfaces and, accordingly, has a relatively reduced cost of manufacture. Additional advantages, features, properties and relationships of this improved universal remote control EL display will be obtained from the following detailed description and accompanying drawings which set forth illustrative embodiments which are indicative of the various ways in which the principles thereof may be employed.

BRIEF DESCRIPTION OF THE DRAWINGS

A universal remote control having a multi-function EL display is described hereinafter with reference to the following drawings in which.

DETAILED DESCRIPTION

Figure 1:
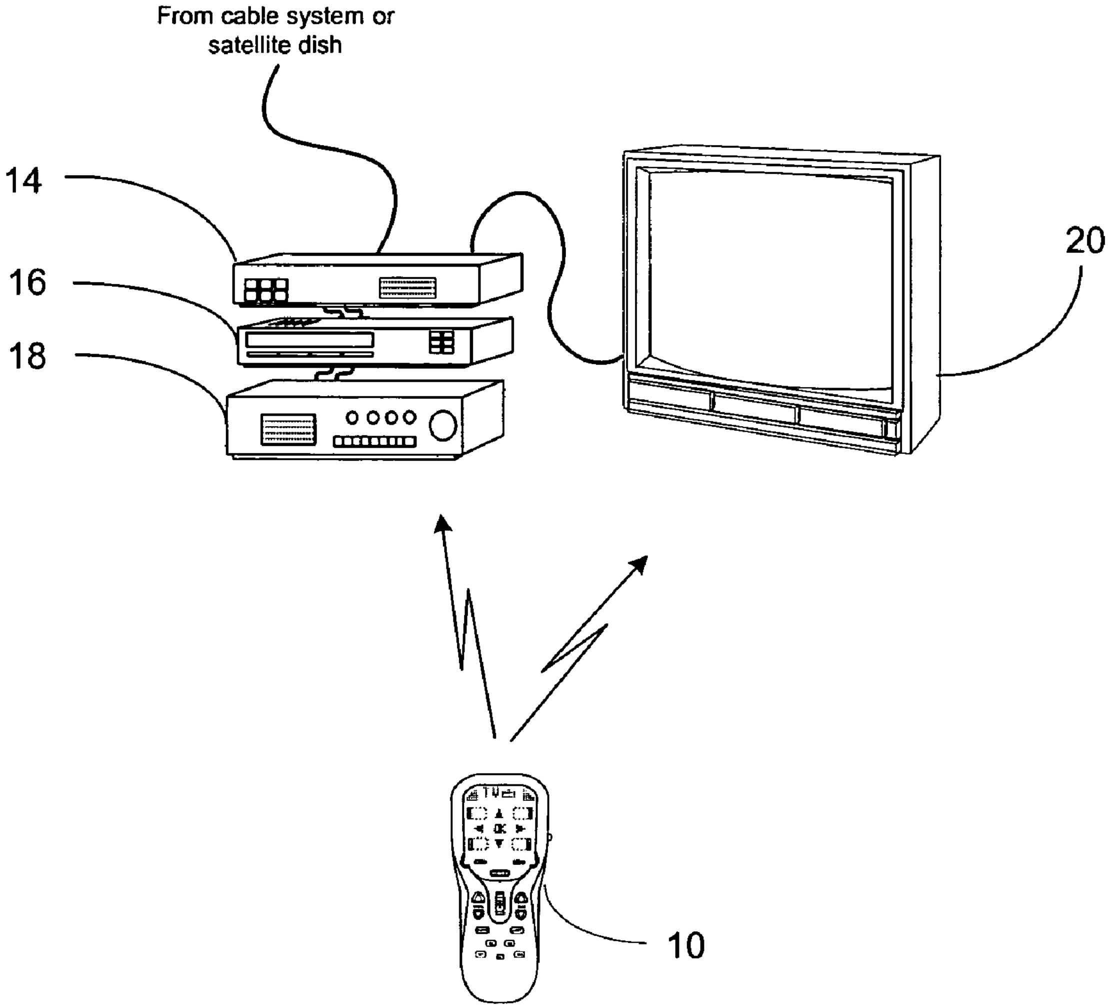
FIG. 1 illustrates an exemplary remote control system including a universal remote control having an EL display and controllable appliances.

With reference to the figures, wherein like reference numerals refer to like elements, a universal remote control 10 having an EL display for presenting multiple remote control user interfaces is described. In this regard, each of the multiple remote control user interfaces provides a user with the ability to use the universal remote control 10 to command functional operations of one or more appliances of various types and various manufacturers. For example, the universal remote control 10 may include a mechanism, e.g., one or more device mode keys, a scroll wheel, navigation keys, or the like, for placing the universal remote control 10 into an operating mode for transmitting commands that are appropriate for the one or more appliances that have been assigned to or setup for that operating mode. In connection with being placed into a particular operating mode, one or more segments in the EL display may be selectively illuminated, in a manner described hereinafter, to present a remote control user interface that is appropriate for that operating mode. It will also be appreciated that each operating mode may also have multiple remote control user interface pages each of which may present one or more function keys that are appropriate for commanding the one or more appliances assigned to or setup for that operating mode, e.g., a remote control interface page providing a numerical keypad, a remote control interface page providing transport function keys, a remote control interface page providing menu navigation function keys, etc.

Among other things, the use of multiple remote control user interface pages in an operational mode (between which a user may navigate) having logical groupings of function keys has the advantage of providing function keys to a user in a relatively less cluttered manner. The same remote control interface page may also be included in a set of remote control interface pages across multiple operational modes.

By way of example, FIG. 1 shows an exemplary system, including controllable appliances, such as a set top box ("STB") 14, a VCR 16, an audio amplifier/receiver 18, and a television 20 which may be commanded through the use of the universal remote control 10. More particularly, the universal remote control 10 is capable of transmitting commands to the appliances, using any convenient IR, RF, Point-to-Point, or networked protocol, to cause the appliances to perform operational functions. While illustrated in the context of a STB 14, VCR 16, audio system 18 and television 20, it is to be understood that controllable appliances can include, but are not limited to, televisions, VCRs, DVRs, DVD players, cable or satellite converter set-top boxes ("STBs"), amplifiers, CD players, game consoles, home lighting, drapery, fans, HVAC systems, thermostats, personal computers, etc.

For use in commanding the functional operations of one or more appliances, the universal remote controls 10 may include, as needed for a particular application, a processor 22 coupled to a memory device (such as ROM memory 36, RAM memory 35, and/or a non-volatile read/write memory 34) a key matrix 26 (e.g., dome style switch contact array 320, silicon rubber keypad 300, or a combination thereof), a segmented, electroluminescent ("EL") display panel 28 overlaying the key matrix 26, EL display interface electronics 30, transmitter circuit 32 (e.g., IR and/or RF), and a non-volatile read/write memory 34. In the illustrated example, the EL display panel 28 may be constructed as described in the aforementioned PCT patent application WO 00/72638 to allow various parts of the display panel to be independently illuminated under the control of the processor 22 and EL display interface 30 to thereby present remote control user interface icons over select areas of the key matrix 26. In this manner, pressure applied to a remote control user interface icon will result in actuation of the underlying dome switch in the key matrix 26, the combination thus forming a function key as will be further described hereafter in connection with FIG. 3.

Figure 2:
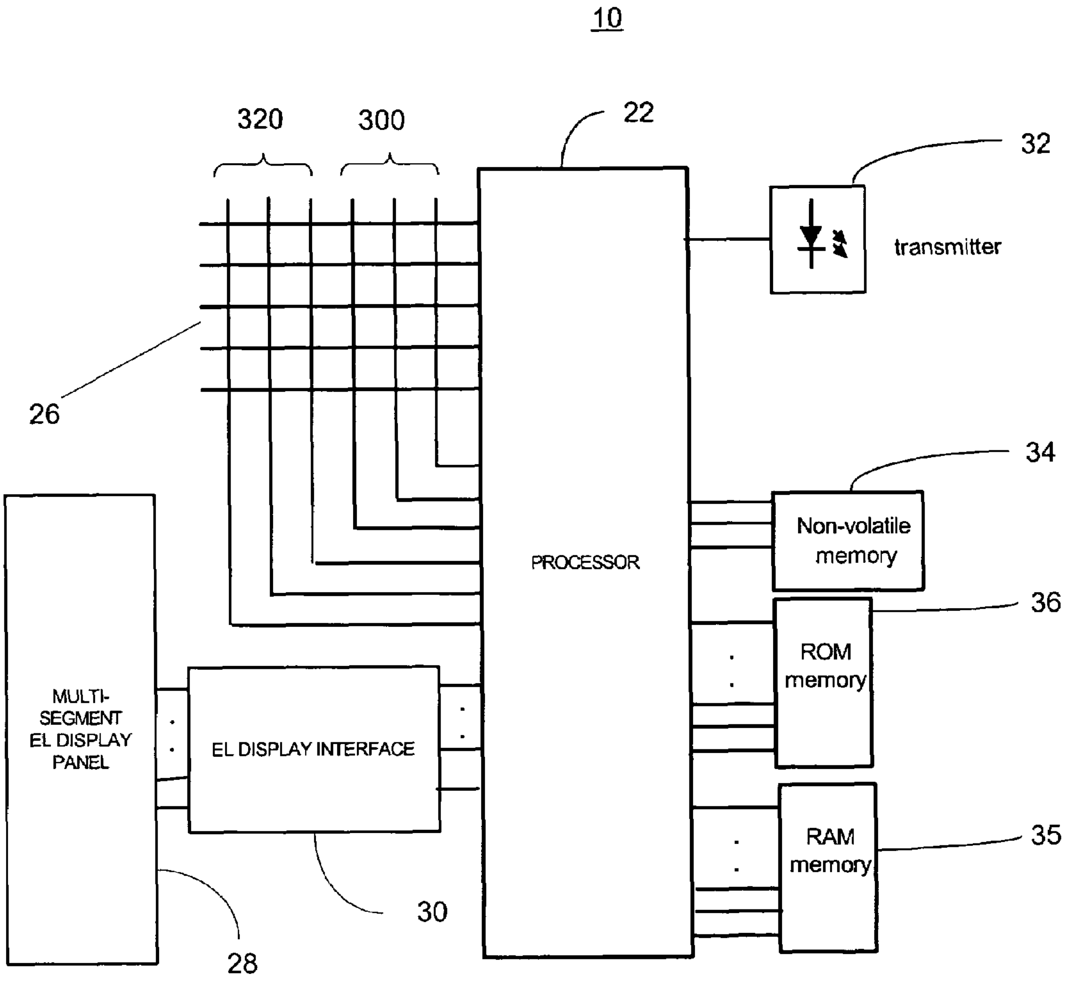
FIG. 2 illustrates a schematic diagram of exemplary components of the universal remote control of FIG. 1.

As will be understood by those skilled in the art, the memory device may include executable instructions that are intended to be executed by the processor 22 to control the operation of the remote control 10. In this manner, the processor 22 may be programmed to control the various electronic components within the remote control 10, e.g., to monitor a power supply (not shown), to cause the transmission of signals, etc. The non-volatile read/write memory 34, for example an EEPROM, Flash, battery-backed up RAM, Smart Card, memory stick, or the like, may be provided to store setup data and parameters as necessary. While the memory 36 is illustrated and described as a ROM memory, memory 36 can also be comprised of any type of readable media, such as ROM, RAM, SRAM, FLASH, EEPROM, or the like which may also be non-volatile or battery-backed such that data is not required to be reloaded after battery changes. In addition, the memory devices may take the form of a chip, a hard disk, a magnetic disk, an optical disk, and/or the like. Still further, it will be appreciated that some or all of the illustrated memory devices may be physically incorporated within the same IC chip as the processor 22 (a so called "microcontroller") and, as such, they are shown separately in FIG. 2 only for the sake of clarity.

Figure 3:
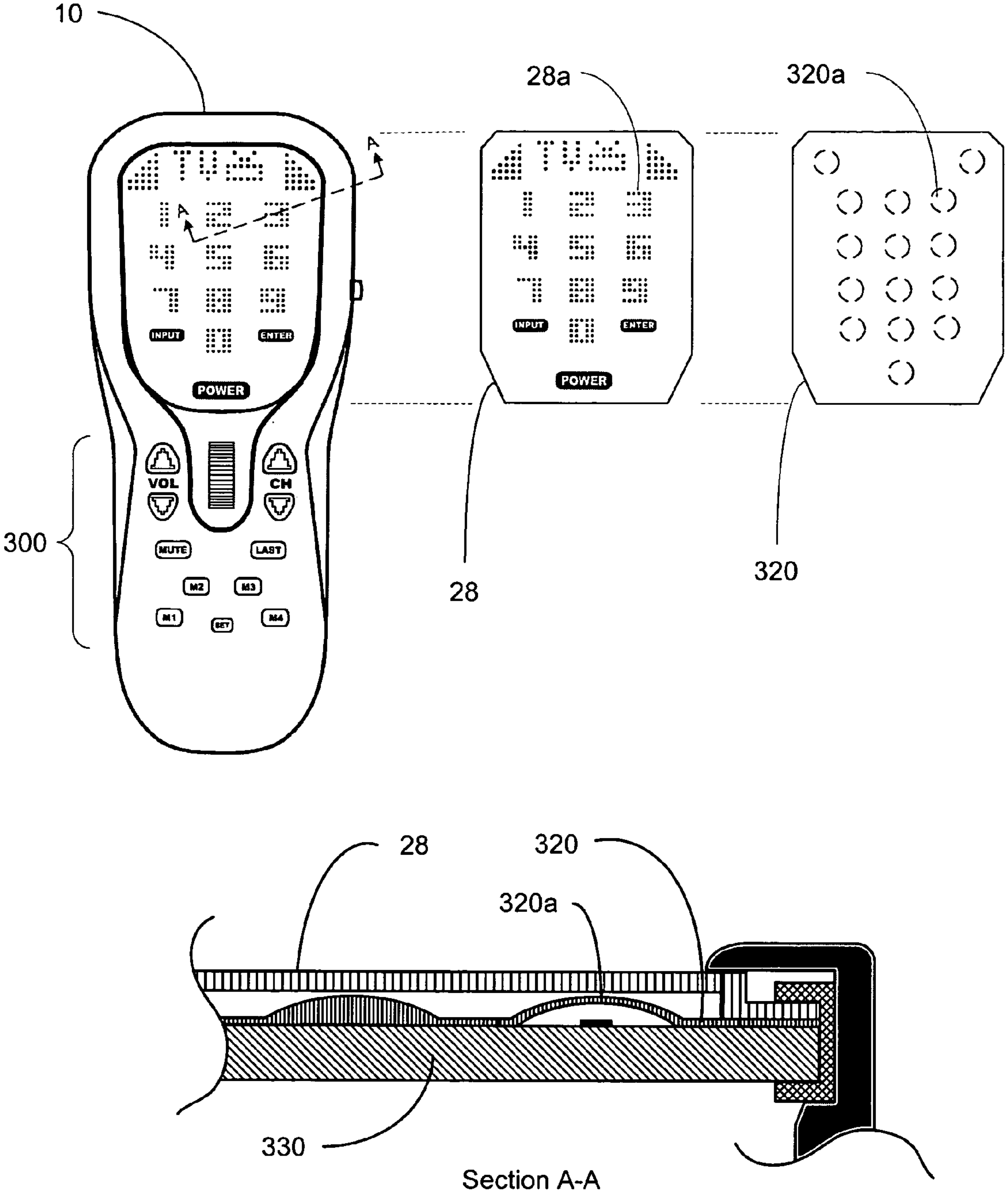
FIG. 3 illustrates an exemplary EL display including a flexible EL panel over a dome switch array.

Turning now to FIG. 3, by way of further example an exemplary remote control 10 may include both conventional silicon rubber keys 300 (as are well known in the art) and a flexible EL display panel 28 arranged over a dome switch matrix 320. In the case of the latter arrangement, it will be appreciated that pressure applied to, for example, a graphical user interface icon 28*a* displayed on the flexible EL panel will result in the corresponding dome switch 320*a* making contact with the underlying printed circuit board 330 to complete a circuit, whereby individual remote control functions are selected by the user. In this exemplary remote control 10, the EL panel 28 may be constructed as described in the aforementioned pending PCT patent application WO 00/72638, which is assigned to Cambridge Consultants Ltd. and which is incorporated herein by reference in its entirety, to allow various parts of the display to be independently illuminated under control of the microprocessor 22 and EL display interface electronics 30, illustrated in FIG. 2. Advantageously, some or all of these independently illuminable parts of the display may be in the form of symbol fragments which can be interleaved in various combinations to form different icons above the same dome switch, as will be described in more detail hereafter. As will be appreciated, the image and/or symbol fragments may comprise contiguous or non-contiguous portions of the EL display as needed for the generation of multiple complete symbols in the same general spot on the EL display.

To cause the universal remote control 10 to perform an action, the universal remote control 10 is adapted to be responsive to events, such as a sensed user interaction with the key matrix 26, receipt of a transmission via a receiver (not illustrated), etc. In response to an event, appropriate instructions within the memory devices may be executed. For example, when a function command key is actuated on the universal remote control 10, the universal remote control 10 may retrieve a command code corresponding to the actuated function command key, in the current device mode, from memory and transmit the command code to an intended target appliance, e.g., STB 14, in a format recognizable by that appliance. It will be appreciated that the instructions within memory can be used not only to cause the transmission of command codes and/or data to the appliances, but also to perform local operations. While not limiting, local operations that may be performed by the universal remote control 10 may include displaying information/data, favorite channel setup, macro key setup, function key relocation, etc. Examples of local operations can be found in U.S. Pat. Nos. 5,481,256, 5,959,751, and 6,014,092 as well as U.S. Published Patent Application No. 2003/0025840.

For creating a correspondence between a command code and a function key, data may be entered into the universal remote control 10 that functions to identify an intended target appliance by its type and make (and sometimes model). Such data allows the universal remote control 10 to transmit recognizable command codes in the format appropriate for such identified appliances. Typically, intended target appliances for function key actuations are identified for each operational mode of the universal remote control 10. Generally a universal remote control has selectable operational modes such as "TV," "AUX," "VCR," "PVR," "CBL," "Home Theater," etc. where each operational mode also has a remote control user interface that includes one or more appropriate functions keys. Since methods for using data to set up the various operational modes of a universal remote control are well-known, such methods need not be described in greater detail herein. Nevertheless, for additional information pertaining to setup procedures, the reader may turn to U.S. Pat. Nos. 4,959, 810, 5,614,906, and 6,225,938. It will also be appreciated that the universal remote control 10 may be set up to command an appliance by being taught the command codes needed to command such appliance as described in U.S. Pat. No. 4,623, 887. Still further, it will be understood that command codes may pre-stored in the universal remote control 10 or the universal remote control 10 may be upgradeable.

Figure 4A:
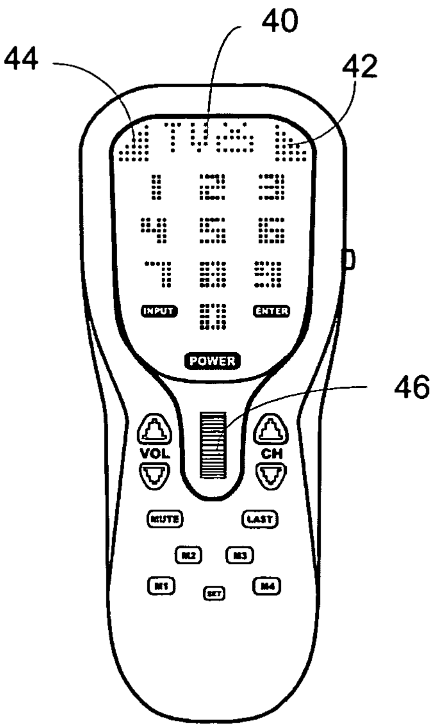
FIGS. 4A-4C illustrate exemplary remote control user interface pages displayable by the universal remote control of FIG. 1.
Figure 4B:
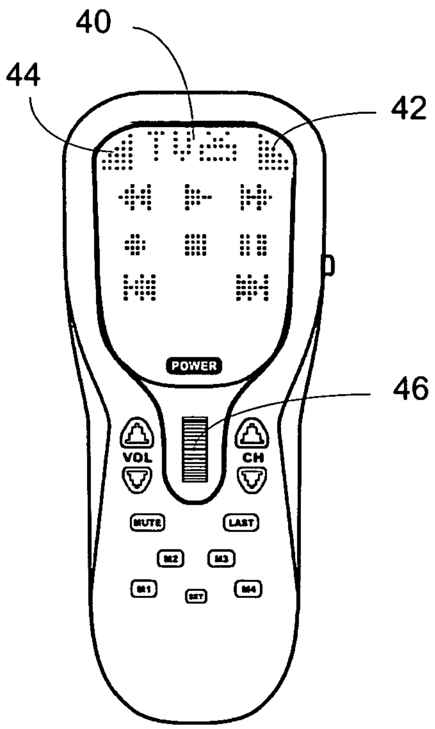
Figure 4C:
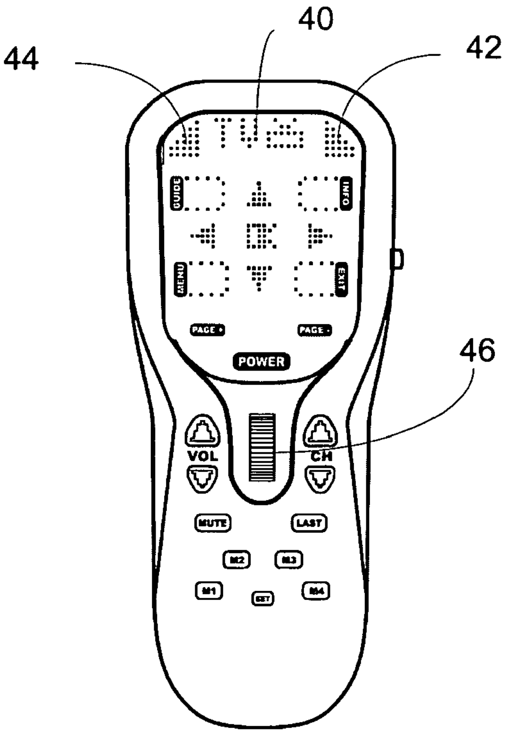

By way of further example, FIG. 4A-4C illustrates exemplary remote control user interface pages having logically grouped function keys. While the illustrated remote control user interface pages are part of the set of remote control user interfaces pages in the "TV" operational mode, it will be appreciated that these remote control user interface pages may also be included as part of a set of remote control user interface pages in other operational modes. In this regard, the user may be informed to the fact that the remote control is in the "TV" operational mode by means of a displayed label 40. Furthermore, function keys 42 and 44 or the like may be provided to allow a user to scroll to and/or select other operational modes for the universal remote control 10. Still further, a scrolling mechanism 46 or the like may be provided to allow a user to navigate between various remote control user interface pages in an operational mode remote control user interface page set.

More specifically, FIG. 4A illustrates a remote control user interface page having a logical grouping of function keys for commanding numeric driven functions, e.g., to command a TV, VCR, STB, DVD player, CD player, or the like to tune to a specific channel or track. Similarly, FIG. 4B illustrates a remote control user interface page having a logical grouping of function keys for commanding transport functions, e.g., to command a VCR, DVD player, CD player, or the like to perform a play, fast forward, rewind, stop, pause, etc. function. Still further, FIG. 4C illustrates a remote control user interface page having a logical grouping of function keys for commanding menu driven functions, e.g., to command a TV, VCR, STB, DVD player, CD player, SAT tuner, or the like to call up and to then navigate a menu, programming guide, etc.

To create the various images included as part of the function keys of the various user interface pages, the EL display panel 28 is provided with multi-function EL segments which are individually illuminable and which include one or more complete function key images, i.e., an image having all of the image information used to represent the commandable function associated with the function key, and/or fragments of complete function key images, i.e., an image typically having a portion of all of the image information used to represent the commandable function associated with the function key. One or more of the EL segments may thus be illuminated to present multiple, different remote control user interfaces each having one or more complete function key images. Specifically, a complete function key image presented as part of a remote control user interface may be a complete function key image that is included as part of an illuminated EL segment or may be a formed by a combination of function key image fragments included as part of multiple illuminated EL segments. Furthermore, by selectively illuminating EL segments, various combinations of EL segment fragments can be used to present various key images on substantially the same spot on the EL panel, i.e., in an area generally over the same key switch.

Figure 5A:
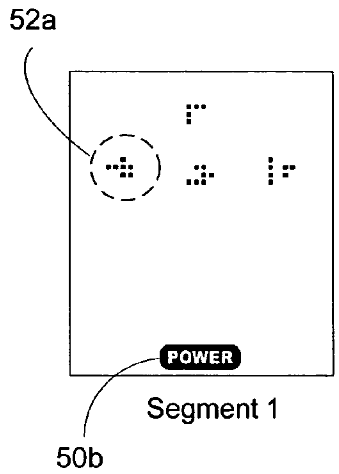
FIGS. 5A-5H illustrate exemplary illuminable EL segments of the flexible EL panel used to generate the remote control user interface pages of FIGS. 4A-4C.
Figure 5B:
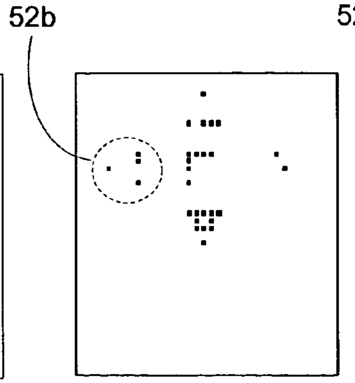
Figure 5C:
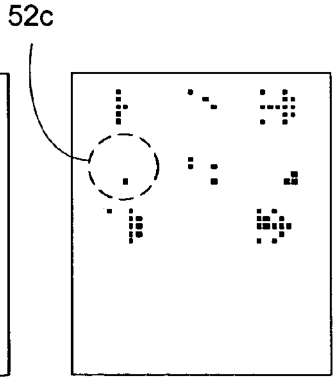
Figure 5D:
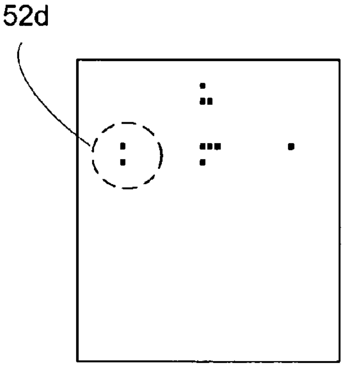
Figure 5E:
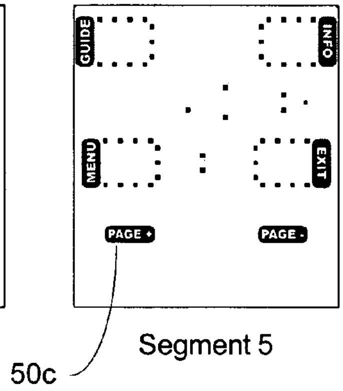
Figure 5F:
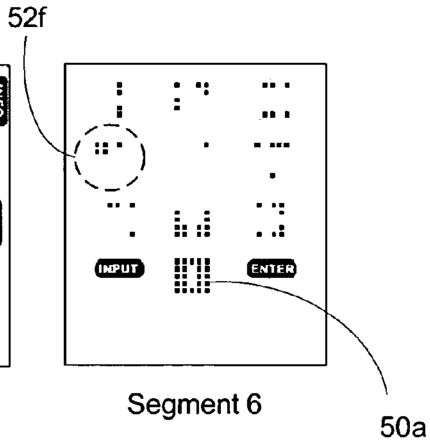
Figure 5G:
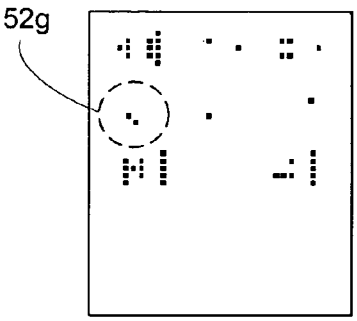
Figure 5H:
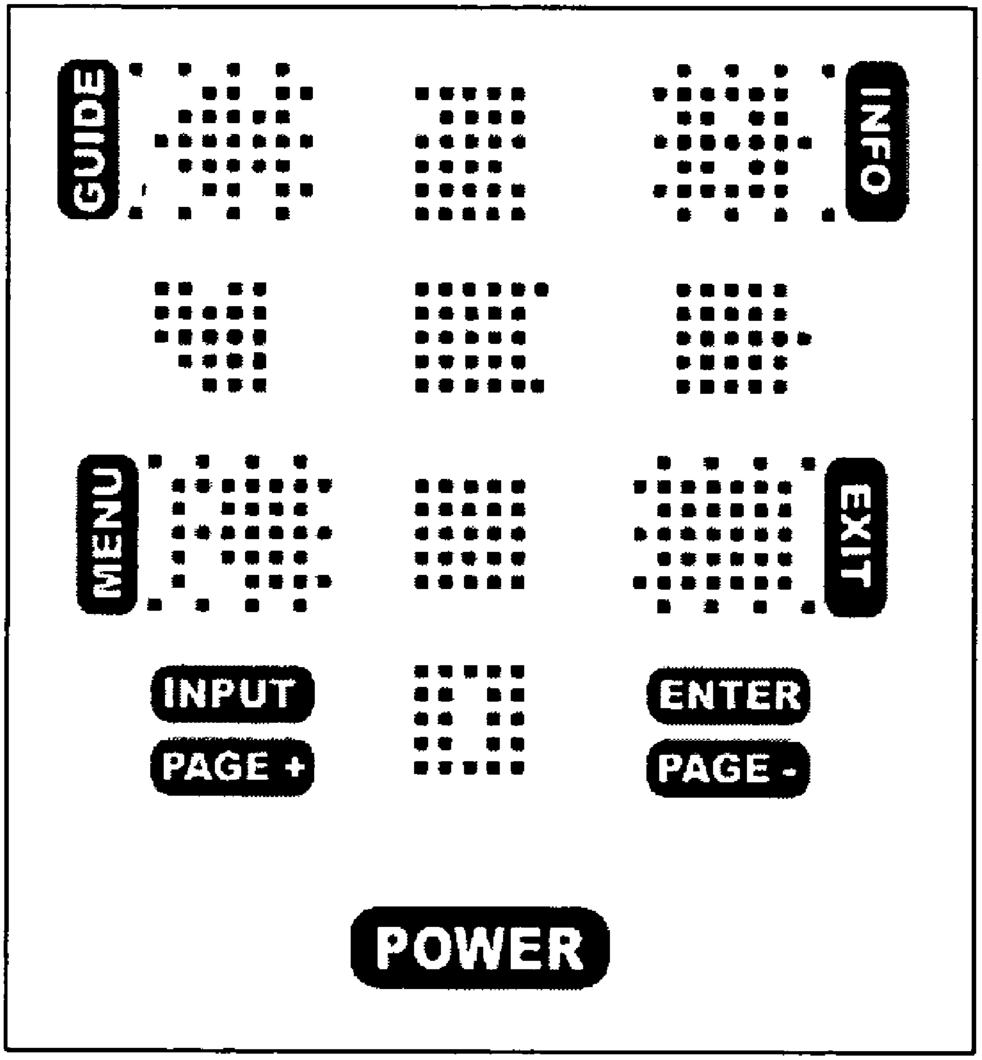

By way of example, FIGS. 5A-5G illustrate exemplary, individually controllable EL segments that may be illuminated in various combinations to create the exemplary remote control user interface pages illustrated in FIGS. 4A-4C. To this end, each of the separately illuminable EL segments 5A-5G may include a complete function key image 50 and/or a fragment of a function key image 52. As will be appreciated, the function key image fragments 52 are derived from the complete image that is to be included as part of the function key when it is displayed to a user in the remote control user interface. To assist in a more complete understanding of the layout and design of the EL panel of exemplary remote control 10, FIG. 5H depicts a view in which all of the exemplary segments are illuminated. This appearance of the EL panel might result from, for example, all of the exemplary segments being illuminated in a factory test mode.

Figure 6:
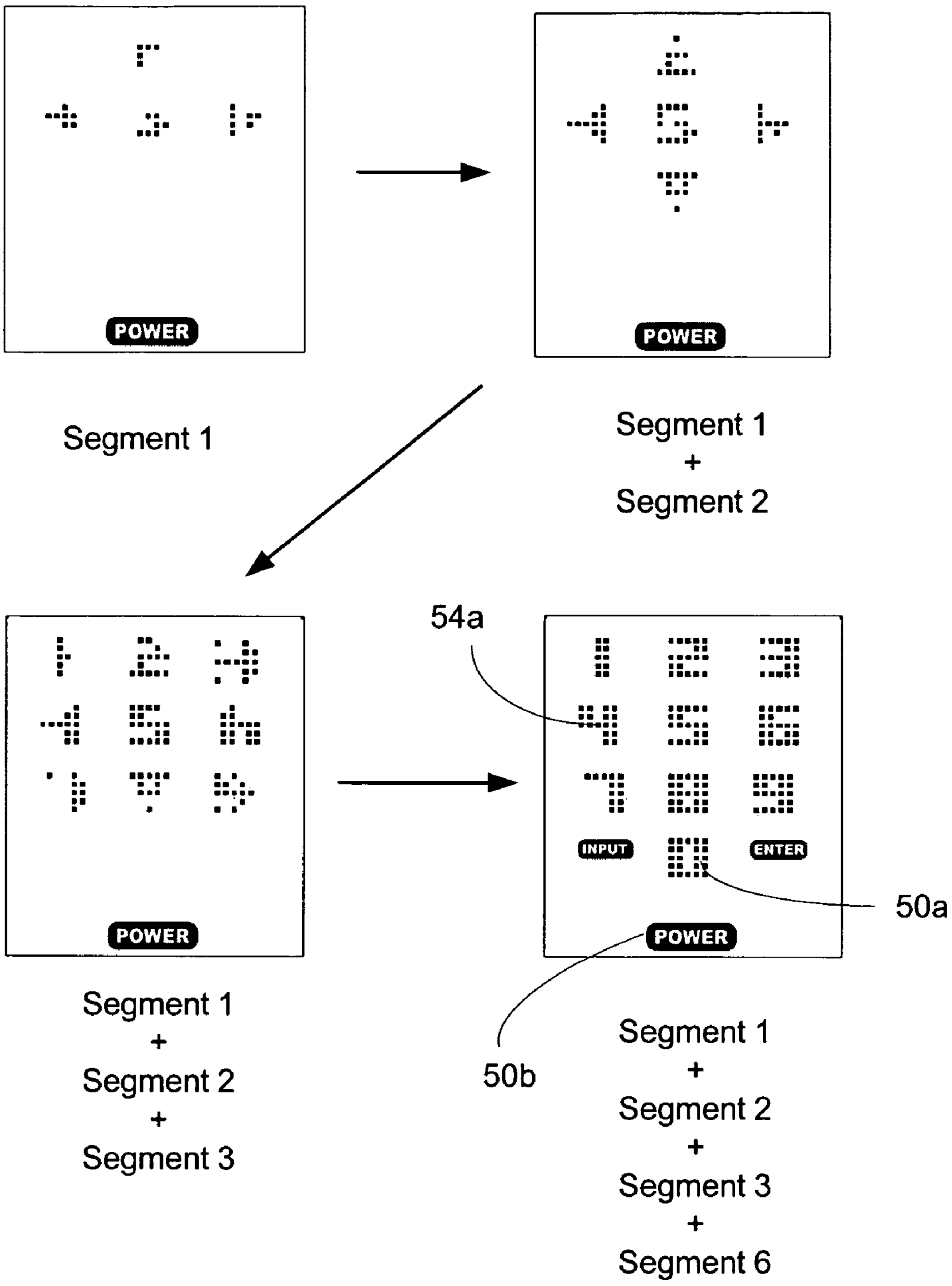
FIGS. 6-8 illustrate methods of combining the illuminable EL segments of FIGS. 5A-5G to arrive at the user interface pages of FIGS. 4A-4C.
Figure 7:
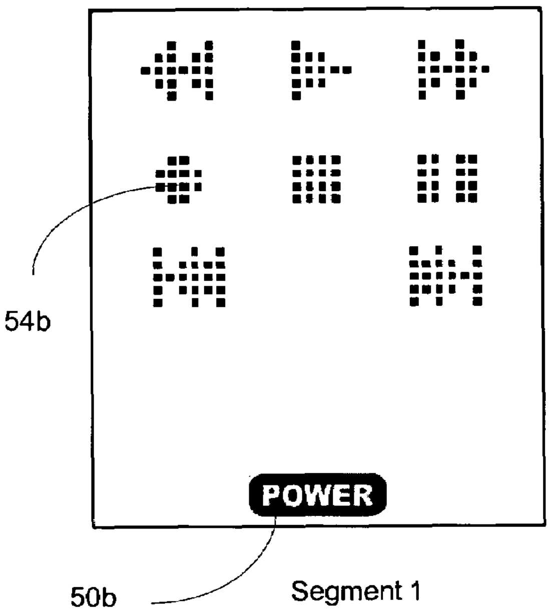
Figure 8:
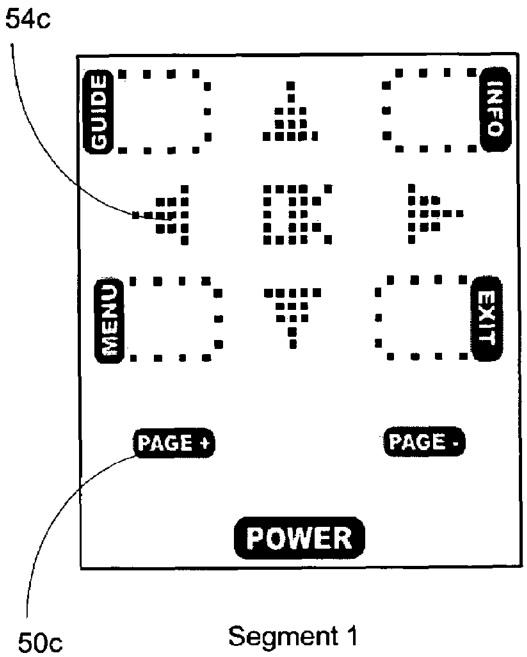

In keeping with this example and with reference to FIGS. 6-8, the remote control user interface page having function keys for commanding numerical functions may be formed by causing EL segments 5A, 5B, 5C, and 5F to be illuminated in combination. As seen in FIG. 6, the finally displayed function key images in this remote control user interface page includes, among others, the complete function key image 50*a* of the EL segment illustrated in FIG. 4F as well as a complete function key image 54*a* formed from a combination of the function key image fragments 52*a*, 52*b*, 52*c*, and 52*f* from the EL segments illustrated in FIGS. 5A, 5B, 5C, and 5F, respectively. Similarly, as seen in FIG. 7, the finally displayed user interface page having function keys for commanding transport functions may have its function key images formed by selectively illuminating a combination of the EL segments illustrated in FIGS. 5A, 5C, 5D, and 5G. These function key images include, among others, the complete function key image 50*b* of the EL segment illustrated in FIG. 5A as well as a complete function key image 54*b* formed from the combination of the function key image fragments 52*a*, 52*c*, 52*d*, and 52*f* from the EL segments illustrated in FIGS. 5A, 5C, 5D, and 5F, respectively. Still further, as seen in FIG. 8, the finally displayed user interface page having function keys for commanding menu related functions may have its function key images formed by selectively illuminating a combination of the EL segments illustrated in FIGS. 5A, 5B, 5D, and 5E. These function key images include, among others, the complete function key image 50*c* of the EL segment illustrated in FIG. 5E as well as a complete function key image 54*c* formed from the combination of function key image fragments 52*a*, 52*b*, and 52*d* from the EL segments illustrated in FIGS. 5A, 5B, and 5D, respectively. As will also be apparent from these illustrated examples, a single function key image fragment 52 may be used in multiple, different combinations with other function key image fragments 52 to create multiple different completed function key images 54, i.e., a key image fragment 52 may be derived from the complete image of more than one function key displayable to a user in the remote control user interface.

From the foregoing, it will be appreciated that the described universal remote control has, among others, the advantage of providing an improved EL display that minimizes the number of separately illuminable EL segments that are required to present multiple remote control user interfaces. For example, an EL display has been described that uses only seven EL segments to provide multiple remote control user interfaces that have an appearance as though generated using a dot-matrix display. It will be appreciated by those skilled in the art, however, that various modifications and alternatives to the details set forth herein could be developed in light of the overall teachings of this disclosure. In this regard, user interfaces generated using the principles disclosed herein need not be limited to the particular function keys, images, etc. that have been illustrated only for the sake of example. Rather, one skilled in the art will be able to readily adapt the teachings of this disclosure to fashion user interfaces for other devices as well as user interfaces having numerous other appearances. For example, it is envisioned that devices and displays such as EL instrument panels for vehicles, EL based presentation systems (including billboards, signs, etc), and user interfaces for consumer electronics, will benefit from the teachings disclosed herein. Similarly, while described in the context of functional modules and illustrated using block diagrams and the like, unless otherwise stated to the contrary, one or more of the described functions and/or features may be integrated in a single physical device and/or a software module in a software product, or one or more functions and/or features may be implemented in separate physical devices or software modules. It will also be understood that a detailed discussion of the actual implementation of each module is not necessary for an enabling understanding of the invention. Rather, the actual implementation of such modules would be well within the routine skill of a programmer and system engineer, given the disclosure herein of the system attributes, functionality, and inter-relationship of the various functional modules in the system. Accordingly, the particular arrangements disclosed are not meant to be limiting as to the scope of the invention which is to be given the full breadth of the appended claims and any equivalents thereof.

What is claimed is:

1. A remote control, comprising:

a plurality of keys in a key matrix; and an electroluminescent (EL) display comprising a plurality of flexible (EL) segments disposed in cooperating relation above the key matrix, each EL segment being individually illuminable and each EL segment having a plurality of image fragments such that the plurality of EL segments are illuminable in various combinations to cause interleaved ones of the plurality of image fragments of illuminated EL segments to be combined in various combinations to form various complete images over corresponding ones of the plurality of keys in the key matrix whereby the remote control is provided with the ability to have various remote control user interfaces.

2. The remote control as recited in claim 1, wherein a remote control user interface displays images representative of logical groupings of function keys.

3. The remote control as recited in claim 2, wherein the logical groupings of functions keys comprise one or more of transport control function keys, numerical function keys, and menu control function keys.

4. The remote control as recited in claim 1, wherein the EL segments are illuminated as a function of a selected operational mode of the remote control.

5. The remote control as recited in claim 4, wherein the EL segments are illuminated as a function of a selected remote control user interface page within the selected operational mode of the remote control.

6. The remote control as recited in claim 1, wherein the complete images have the appearance of being formed through use of a dot matrix display.

7. An electroluminescent (EL) display comprising a plurality of flexible, individually illuminable EL segments disposed in cooperating relation wherein each EL segment has a plurality of image fragments such that the plurality of EL segments are illuminable in various combinations to cause interleaved ones of the plurality of image fragments of illuminated EL segments to be combined in various combinations to form various complete images whereby the various complete images are presentable in substantially the same spot on the EL display.

8. The EL display as recited in claim 7, wherein at least one of the plurality of EL segments further has a complete image.

9. The EL display as recited in claim 7, wherein the complete images have an appearance as if formed through the use of a dot-matrix display.

10. The EL display as recited in claim 7, wherein the EL display is included as part of a touch-screen panel.

11. The EL display as recited in claim 10, wherein the EL display is disposed over a key switch matrix to form the touch-screen panel.

12. The EL display as recited in claim 11, wherein the key switch matrix comprises a plurality of domed switches.

13. The EL display as recited in claim 7, wherein at least one of the image fragments of the plurality of EL segments comprises a non-contiguous portion of the EL display.

14. The EL display as recited in claim 7, wherein the spot on the EL display in which the various complete images are presentable comprises an area generally over a single key switch of the key switch matrix.

* * * * *